United States Patent
Choi et al.

(10) Patent No.: US 11,753,343 B2
(45) Date of Patent: Sep. 12, 2023

(54) METHOD FOR MANUFACTURING SYNTHETIC GEMSTONE

(71) Applicant: VIEA LOGIS Co., Ltd., Seoul (KR)

(72) Inventors: Chul-Hong Choi, Seoul (KR); Dong-Wook Shin, Seongnam-si (KR); In-Sang Yoon, Seoul (KR); Jung-Min Kim, Seoul (KR)

(73) Assignee: VIEABIO TECHNOLOGY CO., LTD., Seoul (KR)

( * ) Notice: Subject to any disclaimer, the term of this patent is extended or adjusted under 35 U.S.C. 154(b) by 869 days.

(21) Appl. No.: 16/803,116

(22) Filed: Feb. 27, 2020

(65) Prior Publication Data
US 2020/0270178 A1 Aug. 27, 2020

(30) Foreign Application Priority Data
Feb. 27, 2019 (KR) .......................... 10-2019-0023349

(51) Int. Cl.
*C04B 32/00* (2006.01)
*A44C 17/00* (2006.01)
*A61G 99/00* (2006.01)
*B01D 11/02* (2006.01)

(52) U.S. Cl.
CPC .......... *C04B 32/005* (2013.01); *A44C 17/007* (2013.01); *A61G 99/00* (2013.01); *B01D 11/0288* (2013.01)

(58) Field of Classification Search
CPC ........................... C04B 32/005; A44C 17/007
See application file for complete search history.

(56) References Cited

FOREIGN PATENT DOCUMENTS

| KR | 100928388 B1 | 11/2009 |
|----|--------------|---------|
| KR | 101878077 B1 | 7/2018  |

*Primary Examiner* — Sikarl A Witherspoon
(74) *Attorney, Agent, or Firm* — Rabin & Berdo, P.C.

(57) ABSTRACT

Provided is a method for manufacturing a synthetic gemstone from a body tissue of a person or an animal, the method including: extracting a biomaterial from the body tissue; manufacturing a raw material mixture by mixing the biomaterial with a gemstone material; and melting the raw material mixture to form a synthetic gemstone on a crystal seed.

8 Claims, 5 Drawing Sheets

METHOD FOR MANUFACTURING SYNTHETIC GEMSTONE

CROSS-REFERENCE TO RELATED APPLICATION

This U.S. non-provisional patent application claims priority under 35 U.S.C. § 119 of Korean Patent Application No. 10-2019-0023349, filed on Feb. 27, 2019, the entire contents of which are hereby incorporated by reference.

BACKGROUND

The present disclosure herein relates to a method for manufacturing a synthetic gemstone. More specifically, the present disclosure relates to a method for manufacturing a synthetic gemstone using a body tissue of a person or an animal.

Biomaterials are manufactured by using body tissues of persons or animals, and the articles manufactured by using the biomaterials may be used for various uses. Lovers may hold articles manufactured by using each other's body tissues to feel existence therebetween, and people may hold an article manufactured by using a body tissue of a favorite entertainer to feel the sense of kinship with the entertainer, and may hold an article manufactured by using a body tissue of a dead person or a pet animal to permanently memorize the dead person or the pet animal.

SUMMARY

The present disclosure provides a method for manufacturing a synthetic gemstone using a body tissue of a person or an animal.

An embodiment of the inventive concept provides a method for manufacturing a synthetic gemstone from a body tissue of a person or an animal, the method including: extracting a biomaterial from the body tissue; manufacturing a raw material mixture by mixing the biomaterial with a gemstone material; and melting the raw material mixture and forming a synthetic gemstone on a crystal seed.

In an embodiment, the extracting of the biomaterial may include dissolving the body tissue into a solution to manufacture a biomaterial-solution.

In an embodiment, the solution may be an acidic solution.

In an embodiment, the acidic solution may be a nitric acid solution.

In an embodiment, the dissolving of the body tissue into the solution may further include stirring the solution.

In an embodiment, the dissolving of the body tissue into the solution may further include heating the solution.

In an embodiment, the extracting of the biomaterial may further include filtering the body tissue which has not been dissolved into the solution.

In an embodiment, the extracting of the biomaterial may further include completely vaporizing water in the biomaterial-solution.

In an embodiment, the extracting of the biomaterial may further include putting the gemstone material into the biomaterial-solution before completely vaporizing water in the biomaterial-solution.

In an embodiment, the forming of the synthetic gemstone may include: a raw material feeding step for feeding the raw material mixture to the raw material feeding part; an igniting and heating step for igniting a flame using oxygen and hydrogen and raising the temperature inside a muffler by the flame; a seed melting step for melting an uppermost portion of the crystal seed; an expanding step for causing the melted raw material mixture to reach the crystal seed to grow a first portion of the synthetic gemstone; a growing step for causing the melted raw material mixture on the first portion to grow a second portion of the synthetic gemstone; and a temperature holding step for decreasing internal stress of the synthetic gemstone.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
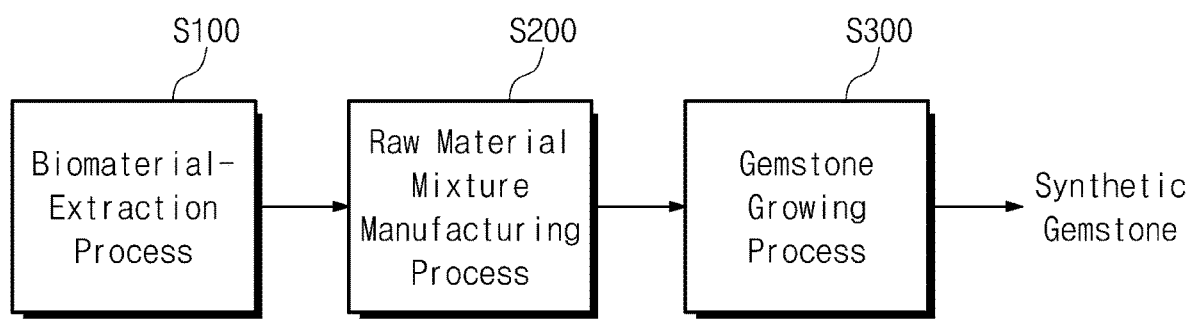
FIG. 1 is a schematic view for describing a sequence of a method for manufacturing a synthetic gemstone according to an embodiment of the inventive concept.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

The terms used in this specification are used for description of exemplar embodiments, and are not for limiting the exemplary embodiments of the inventive concept. In the specification, singular terms include plural terms unless mentioned otherwise in the statement. The meaning of 'comprises' and/or 'comprising' specifies a property, a region, a fixed number, a step, a process, an element and/or a component but does not exclude other properties, regions, fixed numbers, steps, processes, elements and/or components. Hereinafter, embodiments of the inventive concept will be described in detail.

FIG. 1 is a schematic view for describing a sequence of a method for manufacturing a synthetic gemstone according to an embodiment of the inventive concept.

Referring to FIG. 1, method for manufacturing a synthetic gemstone according to an embodiment of the inventive concept may include a biomaterial-extraction process S100, a raw material mixture manufacturing process (S200), and a gemstone growing process S300.

In the biomaterial-extraction process S100, a biomaterial may be extracted from a body tissue of a person or an animal. For example, the body tissue may be at least one among a hair, a nail, a toenail of a person or an animal.

In the raw material mixture manufacturing process S200, the raw material mixture may be manufactured by mixing the biomaterial with a gemstone material. For example, the gemstone material may include at least any one among aluminum oxide, silicon magnesium oxide, or the like. The aluminum oxide may be a gamma-phase aluminum oxide ($\gamma$-$AL_2O$). The gamma-phase aluminum oxide may be manufactured by heating ammonium sulfate ($AL_2(NH_4)_2(SO_4)_4 \cdot 24H_2O$) to about 1,060° C.

In the gemstone growing process S300, a raw material mixture manufactured through the raw material mixture manufacturing process S200 may be grown into a synthetic gemstone.

Figure 2:
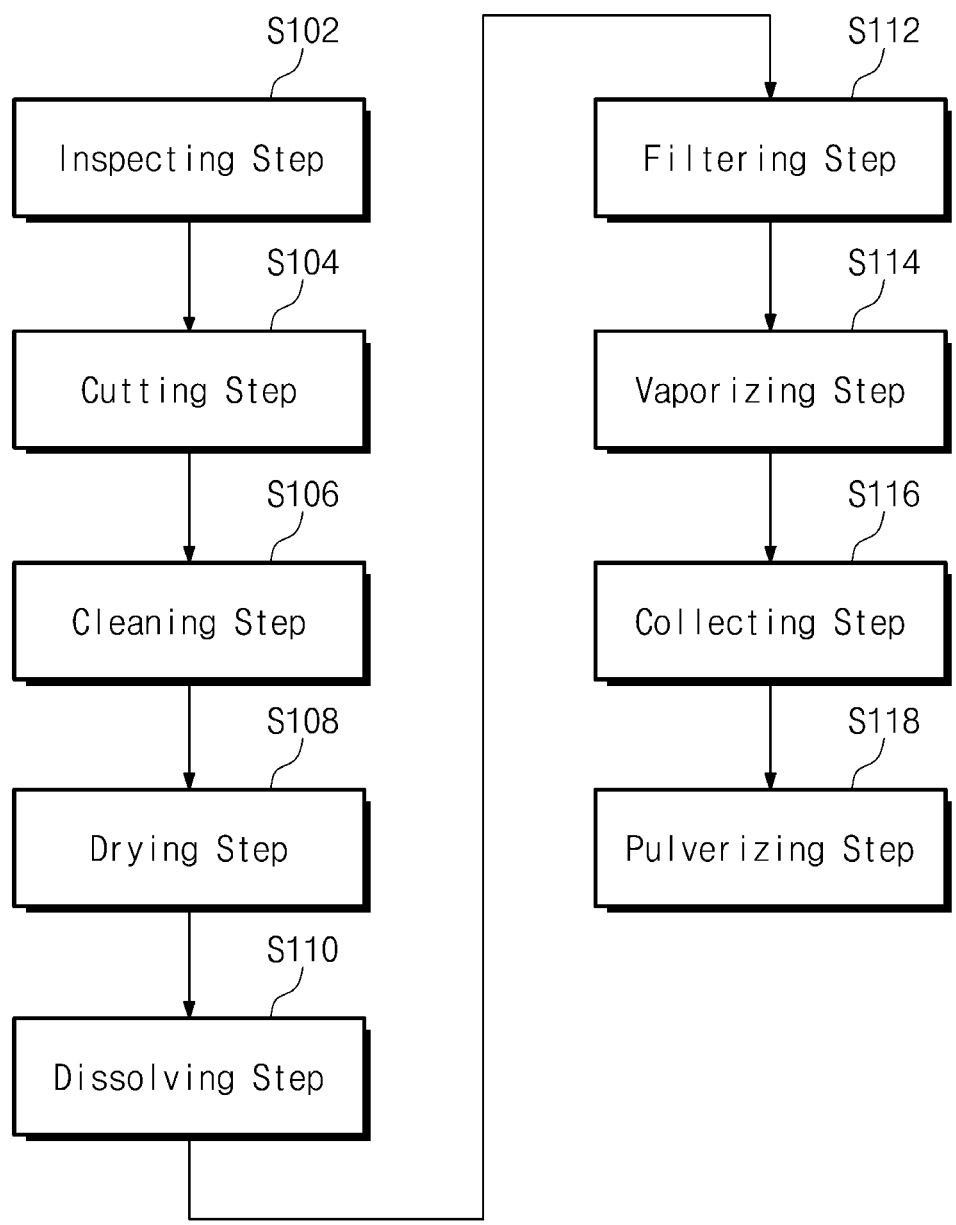
FIG. 2 is a flowchart for describing an embodiment of a biomaterial-extraction process.

FIG. 2 is a flowchart for describing an embodiment of a biomaterial-extraction process.

Referring to FIG. 2, the biomaterial-extraction process S100 according to FIG. 2 may be a wet process for extracting a biomaterial from a body tissue. For example, the body tissue may be at least one among a hair, a nail, a toenail of a person or an animal.

The biomaterial-extraction process S100 according to FIG. 2 may include an inspection step S102, a cutting step S104, a cleaning step S106, a drying step S108, a dissolving step S110, a filtering step S112, a vaporizing step S114, a collecting step S116, and a pulverizing step 118.

The inspection step S102 may include inspecting a body tissue. The inspecting of a body tissue may include inspecting the weight of the body tissue and inspecting the state of the body tissue.

The cutting step S104 may include cutting the body tissue. For example, the body tissue may be cut using scissors.

The cleaning step S106 may include cleaning the cut body tissue. The cleaning of the cut body tissue may include putting the body tissue into a first beaker, putting a cleaning liquid into the first beaker, and cleaning the body tissue with the cleaning liquid. The cleaning liquid may include Alconox and distilled water. The Alconox may be one among the cleaning liquids manufactured by U.S. Alconox, Inc. For example, the cleaning of the body tissue with the cleaning liquid may include cleaning the body tissue using a stirring machine and a stirrer. The stirring machine may be a magnetic stirring machine. The stirrer may be a magnetic stirrer. The stirrer may be provided inside the first beaker filled with the body tissue and the cleaning liquid and rotate by a magnetic field generated by the stirring machine.

The cleaning step S106 may further include cleaning the cleaning liquid from the body tissue. The cleaning of the liquid from the body tissue may include filtering the body tissue from the cleaning liquid using a first mesh net, putting the filtered body tissue into a second beaker, putting distilled water into the second beaker, and cleaning the body tissue with distilled water.

The drying step S108 may include filtering the body tissue using a second mesh net and drying the filtered body tissue. The drying of the body tissue may include drying the body tissue using an oven.

In the dissolving step S110, the body tissue may be dissolved into a solution. The solution may be an acidic solution. The acidic solution may be a nitric acid solution. For example, the acidic solution may include about 20-60 wt % of nitric acid ($HNO_3$) and about 40-80 wt % of distilled water.

The dissolving of the body tissue may include putting an acidic solution into a third beaker, putting the body tissue into the acidic solution inside the third beaker, stirring the acidic solution using a stirring machine and a stirrer, and heating the acidic solution using the stirring machine.

The stirring machine may be a magnetic stirring machine. The stirrer may be a magnetic stirrer. The stirrer may be provided inside the third beaker filled with the body tissue and the acidic solution and rotate by a magnetic field generated by the stirring machine. The stirring of the acidic solution may also be omitted.

The acidic solution may be heated to about 40-70° C. using the stirring machine. The heating and stirring of the acidic solution may simultaneously be performed. The stirring machine may perform the same function a hot plate to heat the acidic solution. The heating of the acidic solution may also be omitted.

For example, the dissolving of the body tissue may be performed for about 24 hours. Through the dissolving step S110, a portion of the body tissue may be dissolved into the acidic solution, and the other portion of the body tissue may not be dissolved. The acidic solution into which the body tissue is dissolved may be defined as a biomaterial-solution.

The biomaterial-solution may include an element contained in the body tissue of a person or an animal. For example, the biomaterial-solution may include at least one among Al, B, Ba, Ca, Cr, Cu, Fe, K, Li, Mg, Mn, Na, Ni, Sr, Ti, V, Zn, Si, P or S.

In the filtering step S112, a non-dissolved body tissue may be filtered. For example, the non-dissolved body tissue inside the biomaterial-solution may be filtered by using a third mesh net. In another example, the non-dissolved body tissue inside the biomaterial-solution may be filtered by using a centrifuge. The non-dissolved body tissue may be defined as sludge.

In the vaporizing step S114, water inside the biomaterial-solution may completely be vaporized. In other words, the nitric acid ($HNO_3$) and the distilled water inside the solution may all be vaporized. Vaporizing water in a diluted liquid may include putting a biomaterial-solution and a gemstone material into a fourth beaker, placing the fourth beaker on a hot plate, and heating the biomaterial-solution with the hot plate to boil the biomaterial-solution. For example, the biomaterial-solution may be heated to about 250° C. The amount of the gemstone material may be relatively smaller than that of the gemstone material added later in the raw material mixture manufacturing process S200. For example, the gemstone material may include at least any one among aluminum oxides, silicon magnesium oxides, or the like. The aluminum oxides may be a gamma-phase aluminum oxide ($\gamma$-$AL_2O$).

As the water inside the biomaterial-solution is completely vaporized, the biomaterial and the gemstone material inside the fourth beaker may be precipitated. The biomaterial and the gemstone material may be attached to the side wall and the bottom surface of the fourth beaker and precipitated. For example, the biomaterial may include at least one among Al, B, Ba, Ca, Cr, Cu, Fe, K, Li, Mg, Mn, Na, Ni, Sr, Ti, V, Zn, Si, P or S.

In the collecting step S116, the biomaterial and the gemstone material which are attached to the side wall and the bottom surface of the fourth beaker may be collected. For example, the biomaterial and the gemstone material which are attached to the side wall and the bottom surface of the fourth beaker may be scraped and collected by using a spoon. In the vaporizing step S114, as the gemstone material is put into the fourth beaker, the amount of the precipitated materials (the sum of the biomaterial and the gemstone material) may increase, and the collecting of the biomaterial may be relatively facilitated.

In the pulverizing step S118, the collected biomaterial and the gemstone material may be finely pulverized. The biomaterial and the gemstone material may be finely pulverized using a mortar and a pestle.

Figure 3:
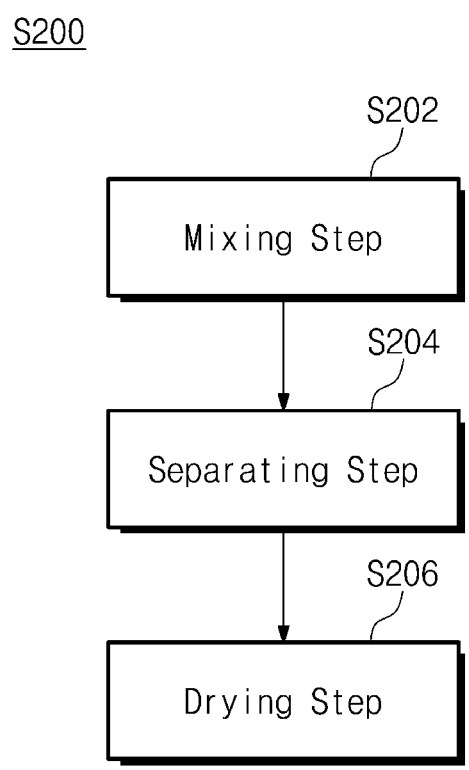
FIG. 3 is a flowchart for describing an embodiment of a raw material mixture manufacturing process.

FIG. 3 is a flowchart for describing an embodiment of a raw material mixture manufacturing process.

Referring to FIG. 3, the raw material mixture manufacturing process S200 may include a mixing step S202, a separating step 204 and a drying step S206.

In the mixing step S202, a gemstone material may be added to the biomaterial-material and the gemstone material which are pulverized in the biomaterial-extraction process S100. A raw material mixture may be generated by mixing the biomaterial, the gemstone material, and the added gemstone material. The mixing of the biomaterial, the gemstone material, and the added gemstone material may include putting ceramic balls into the biomaterial, the gemstone material and the added gemstone material and operating a mixer for about 10 minutes to about 1 hour. When adding the ceramic balls into the mixer, the uniformity of the raw material mixture may be relatively high. For example, the ceramic balls may be zirconium balls. For example, the mixer may be a double shaking mixer or a ball mill mixer.

In the separating step S204, the raw material mixture and the ceramic balls may be separated. The raw material mixture and the ceramic balls may be separated by using a fourth mesh net. As the raw material mixture passes through the fourth mesh net, the dustability of the raw material mixture may increase.

In the drying step S206, the raw material mixture may be dried. The drying of the raw material mixture may include drying the raw material mixture using an oven. The dustability of the raw material mixture may be increased by the drying step 206.

Figure 4:
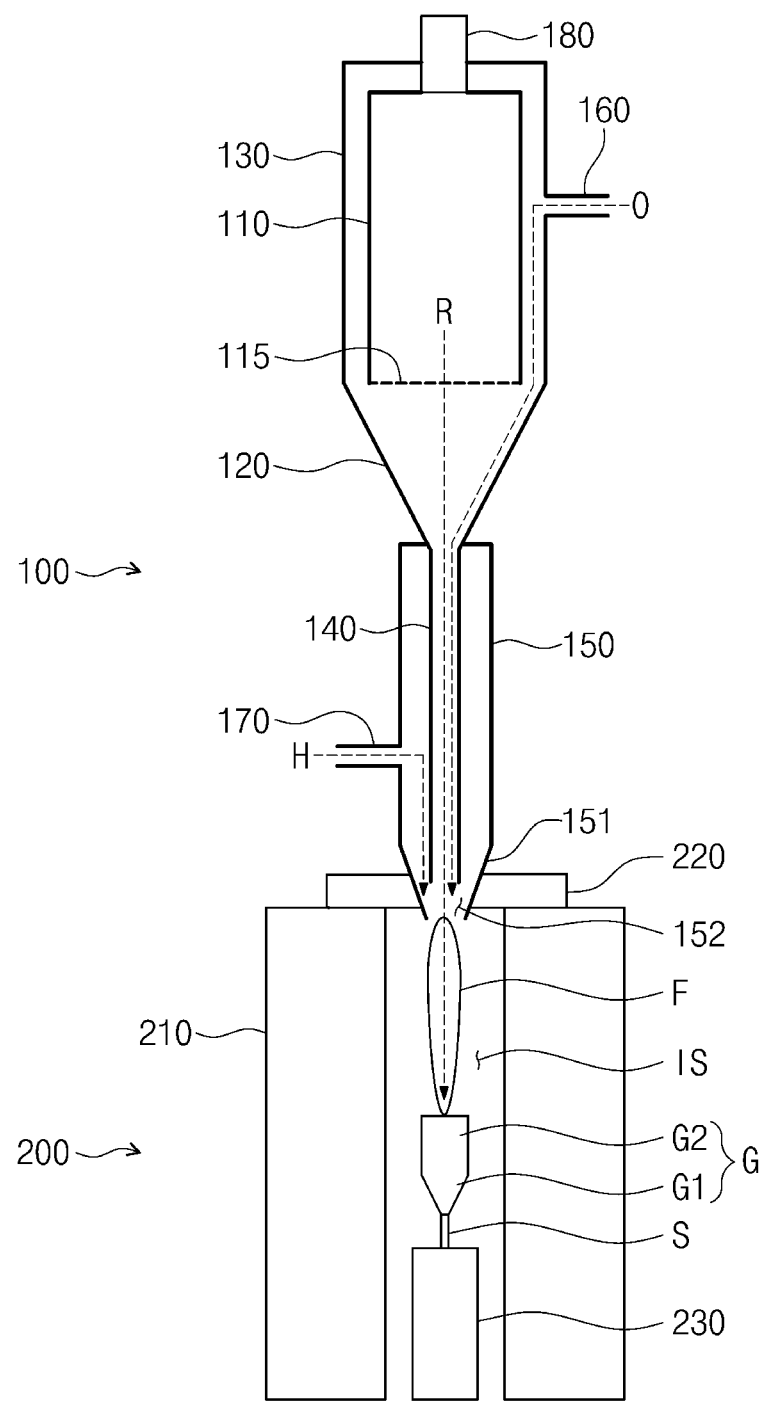
FIG. 4 is a cross-sectional view for describing a gemstone growing apparatus.
Figure 5:
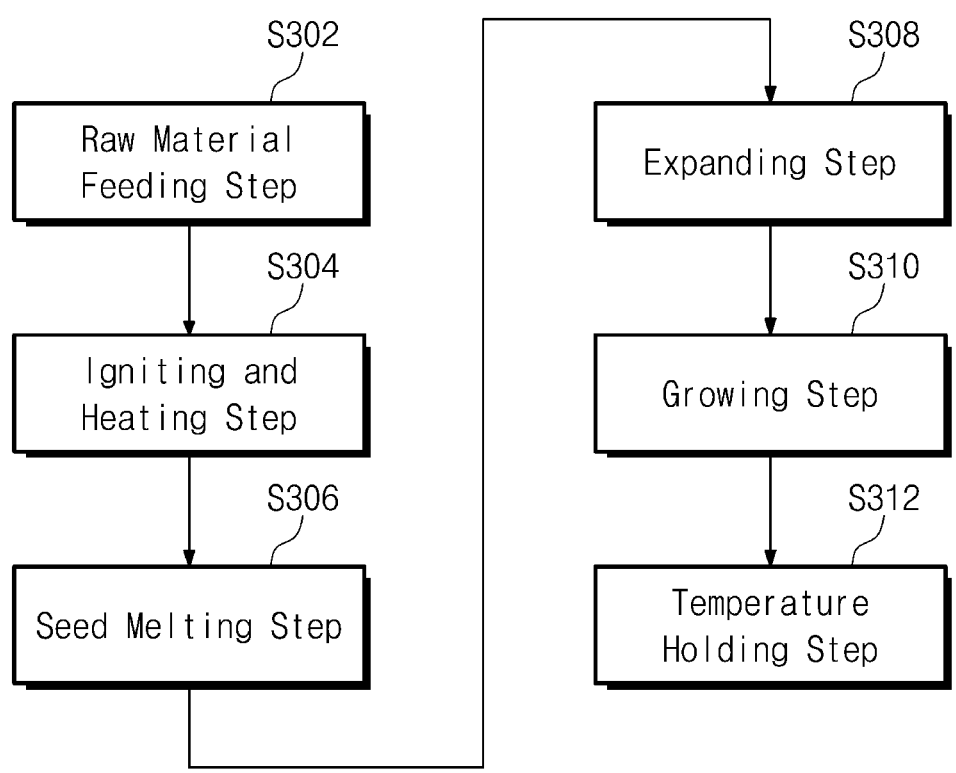
FIG. 5 is a flowchart for describing an embodiment of a gemstone growing process.

FIG. 4 is a cross-sectional view for describing a gemstone growing apparatus. FIG. 5 is a flowchart for describing an embodiment of a gemstone growing process.

Referring to FIG. 4, the gemstone growing apparatus may include a raw material feeding part 100 and a gemstone growing part 200.

The raw material feeding part 100 may include a raw material mixture feeding part 110, a mesh net 115, a hopper 120, a first tube 130, a second tube 140, a third tube 150, an oxygen feeding tube 160, a hydrogen feeding pipe 170 and a tapping part 180.

The first tube 130 may be connected to the hopper 120. The raw material mixture feeding part 110 may be provided inside the first tube 130. A raw material mixture R may be fed to the raw material mixture feeding part 110. The mesh net 115 may be provided between the raw material mixture feeding part 110 and the hopper 120. The raw material mixture R inside the raw material mixture feeding part 110 may move to the hopper 120 through the mesh net 115. The tapping part 180 may be provided on the raw material mixture feeding part 110. The tapping part 180 may apply a force to the raw material mixture feeding part 110. Due to the physical force applied by the tapping part 180, the raw material mixture R inside the raw material mixture feeding part 110 may move to the hopper 120 through the mesh net 115.

The oxygen feeding tube 160 may be connected to the side wall of the first tube 130. Oxygen (O) may be fed to the first tube 130 through the oxygen feeding tube 160. Oxygen (O) may move to the hopper 120 through the first tube 130. The hopper 120 may have a funnel shape.

The hopper 120 may be connected to the second tube 140. The raw material mixture R and the oxygen (O) inside the hopper 120 may move to the second tube 140. The oxygen (O) may function as a carrying gas of the raw material mixture R inside the hopper 120 and the second tube 140. In other words, the raw material mixture R may be moved by the movement of the oxygen (O).

The third tube 150 surrounding the second tube 140 may be provided. In other words, the second tube 140 may be provided inside the third tube 150. The oxygen feeding tube 170 may be connected to the side wall of the first tube 150. Hydrogen (H) may be fed to the third tube 150 through the hydrogen feeding tube 170.

The third tube 150 may include a step part 151 connected to the gemstone growing part 200. An opening 152 may be provided to an end portion 151 of the third tube 150. Hydrogen (H) and oxygen (O) may be discharged through the opening 152 of the third tube 150. The raw material mixture R may be discharged through the opening 152 of the third tube 150.

An ignition plug (not shown) may be provided near the opening 152 of the third tube 150. A flame F may be formed by the ignition of the ignition plug using hydrogen (H) and oxygen (O) as a fuel.

The gemstone growing part 200 may include a muffle 210, a sealing part 220 and a supporter 230.

The muffle 210 may include an inner space IS therein. The inner space IS of the muffle 210 may communicate with the inside of the third tube 150 through the opening 152 of the third tube 150.

The sealing part 220 may be provided between the outer wall of the end portion 151 and the muffle 210. The sealing part 220 may fix the third tube 150. The sealing part 220 may seal the inner space IS of the muffler 210 so that the inner space IS of the muffle 210 does not communicate with an external space above the muffle 210.

The supporter 230 may be provided which is configured to be movable upward and downward. The supporter 230 may enter into the inner space IS of the muffle 210 in the external space below the muffle 210 while moving upward, and come out of the external space below the muffle 210 in the inner space IS of the muffle IS while moving downward. A crystal seed S may be provided on the supporter 230. The crystal seed S may be a seed for a synthetic gemstone G to be grown.

The flame F may be formed in the inner space IS of the muffle 210 due to hydrogen (H) and oxygen (O). The raw material mixture R, moved to the inner space IS of the muffle 210 through the opening 152 of the third tube 150, and may be melted by the flame F.

Referring to FIGS. 4 and 5, the gemstone growing process S300 may include a raw material feeding step S302, an igniting and heating step S304, a seed melting step S306, an expanding step S308, a growing step S310, and a temperature holding step S312.

In the raw material feeding step S302, a raw material may be fed to the raw material feeding part 100. The raw material mixture R may be fed to the raw material mixture feeding part 110, oxygen (O) may be fed to an oxygen feeding tube 160, and hydrogen (H) may be fed to the hydrogen feeding tube 170.

Oxygen (O) may move along the first tube 130, the hopper 120, and the second tube 140, and be discharged through the opening 152 of the third tube 150. Hydrogen (H) may move along the third tube 150, and be discharged through the opening 152 of the third tube 150.

The flame F may be generated in the igniting and heating step S304. The hydrogen (H) and oxygen (O) which are discharged through the opening 152 of the third tube 150 are ignited by the ignition plug and may generate the flame F. The flame F may be generated inside the inner space IS of the muffle 210. The temperature of the inner space IS of the muffle 210 may be raised by the flame F generated inside the inner space IS of the muffle 210.

In the seed melting step S306, a crystal seed S may be provided on the supporter 230. Subsequently, the supporter 230 may be raised so that the uppermost portion of the crystal seed S comes into contact with the lowermost portion of the flame F. While the uppermost portion of the crystal seed S comes into contact with the flame F, the uppermost portion of the crystal seed S may be melted. The diameter of the uppermost portion of the melted crystal seed S may be larger than the diameter of the uppermost portion of the crystal seed S before the crystal seed is melted.

In the expanding step S308, a first portion G1 of the gemstone G may grow on the crystal seed S. When a physical force is applied to the raw material mixture feeding part 110, the raw material mixture R inside the raw material mixture feeding part 110 may pass the mesh net 115 and move to the hopper 120. The raw material mixture R may move along the hopper 120 and the second tube 140, and be discharged through the opening 152 of the third tube 150. The raw material mixture R discharged through the opening 152 of the third tube 150 may be melted by the flame F. The raw material mixture R melted by the flame F reaches the uppermost portion of the melted crystal seed S, and the first portion G1 of the synthetic gemstone G may grow.

The diameter of the first portion G1 of the synthetic gemstone G may increase while the first portion grows. As the amount of oxygen (O) supplied through the oxygen feeding tube 160 is gradually increased, the first portion of the synthetic gemstone G may have an increasing diameter while growing. As the first portion G1 of the synthetic gemstone G grows, the supporter 230 may be lowered. As the supporter 230 is lowered, the first portion G1 of the synthetic gemstone G may grow so that a state is maintained in which the uppermost portion of the first portion G1 of the synthetic gemstone G and the lowermost portion of the flame F are in contact with each other. In other words, the supporter 230 may be lowered according to the growth of the synthetic gemstone.

In the growing step S310, a second portion G2 of the gemstone G may grow on the first portion G1 of the synthetic gemstone G. The second portion G2 of the synthetic gemstone G may grow so as to maintain the diameter thereof. As the amount of oxygen (O) supplied through the oxygen feeding tube 160 is maintained, the second portion G2 of the synthetic gemstone G may grow so as to maintain the diameter thereof. As the second portion G2 of the synthetic gemstone G grows, the supporter 230 may be lowered. As the supporter 230 is lowered, the second portion G2 of the synthetic gemstone G may grow so that the state is maintained in which the uppermost portion of the second portion G2 of the synthetic gemstone G and the lowermost portion of the flame F are contact with each other.

In the temperature holding step S312, when the growth of the synthetic gemstone G is completed, the flame f may be extinguished by stopping the supply of oxygen (O) and hydrogen (H). Even when the flame F is extinguished, the temperature of the inner space IS of the muffle 210 may be maintained to be relatively high for a certain time period. The synthetic gemstone G may be relatively slowly extracted from the inner space IS of the muffle 210 by lowering the supporter 230. As the synthetic gemstone G is relatively slowly extracted from the inner space IS of the muffle 210, the internal stress of the synthetic may be decreased.

In a method for manufacturing a synthetic gemstone according to an embodiment of the inventive concept, a body tissue of a person or an animal is dissolved and then, a biomaterial is extracted, and thus, a synthetic gemstone may be manufactured by using the body tissue of a person or an animal.

So far, embodiments of the present invention has been described with reference to the accompanying drawings, but those skilled in the art to which the present invention belongs could understand that the present invention may be implemented in other specific forms without changing the spirit or characteristics thereof. Thus, the above-disclosed embodiments are to be considered illustrative and not restrictive.

What is claimed is:

1. A method for manufacturing a synthetic gemstone from a body tissue of a person or an animal, the method comprising:
    extracting a biomaterial from the body tissue;
    manufacturing a raw material mixture by mixing the biomaterial with a gemstone material; and
    melting the raw material mixture to form a synthetic gemstone on a crystal seed;
    wherein the extracting of the biomaterial comprises dissolving the body tissue into a solution to manufacture a biomaterial-solution and completely vaporizing water in the biomaterial-solution.

2. The method of claim 1, wherein the solution is an acidic solution.

3. The method of claim 2, wherein the acidic solution is a nitric acid solution.

4. The method of claim 1, wherein the dissolving of the body tissue into the solution further comprises stirring the solution.

5. The method of claim 1, wherein the dissolving of the body tissue into the solution further comprises heating the solution.

6. The method of claim 1, wherein the extracting of the biomaterial further comprises filtering the body tissue which has not been dissolved into the solution.

7. The method of claim 1, wherein the extracting of the biomaterial further comprises putting the gemstone material into the biomaterial-solution before completely vaporizing water in the biomaterial-solution.

8. The method of claim 1, wherein the forming of the synthetic gemstone comprises:
    a raw material feeding step for feeding the raw material mixture to a raw material feeding part;
    an igniting and heating step for igniting a flame using oxygen and hydrogen and raising the temperature inside a muffler by the flame;
    a seed melting step for melting an uppermost portion of the crystal seed; an expanding step for causing the melted raw material mixture to reach the crystal seed to grow a first portion of the synthetic gemstone;
    a growing step for causing the melted raw material mixture on the first portion to grow a second portion of the synthetic gemstone; and
    a temperature holding step for decreasing internal stress of the synthetic gemstone.

* * * * *